United States Patent Office 3,681,271
Patented Aug. 1, 1972

3,681,271
PROCESS FOR THE PRODUCTION OF POLY-
URETHANE FOAM FROM POLYISOCYA-
NATE AND POLYETHER POLYOL OR POLY-
ESTER POLYOL IN THE PRESENCE OF
STANNOXANE CATALYST
Makoto Yokoo, Toyonaka, Akizo Keshi, Takatsuki, Nori-
shige Hashimoto, Nishinomiya, and Shigenobu Naka-
hara, Suita, Japan, assignors to Takeda Chemical In-
dustries, Ltd., Osaka, Japan
No Drawing. Continuation-in-part of application Ser. No.
754,716, Aug. 22, 1968, which is a continuation-in-part
of application Ser. No. 397,609, Sept. 18, 1964. This
application Sept. 25, 1970, Ser. No. 75,727
Claims priority, application Japan, Sept. 27, 1963,
38/51,576
Int. Cl. C08g 22/42, 22/46
U.S. Cl. 260—2.5 AC                                17 Claims

ABSTRACT OF THE DISCLOSURE

As catalyst for the reaction of an isocyanate with a compound having active hydrogen atoms, certain octa-alkyl-stannoxanes(I) e.g. octabutyl-dichloro-dihydroxy-stannoxane, octabutyl - diacetoxy-dihydroxy-stannoxane, octabutyl - tetraacetoxy-stannoxane, octabutyl-dimethoxy-diacetoxy - stannoxane, octabutyl-tetraisocyanate-stannox-ane, octabutyltetraisothocyanate-stannoxane, and others named in the specification infra, unexpectedly have a catalytic activity which is several tenfold times higher than that of the compounds (e.g. dibutyltin-dilaurate, tin(II)-2-ethylhexoate, triethylenediamine, etc.) which have heretofore been regarded as having the highest catalytic activity for the said reaction. Compounds I can be used as sole catalyst for the production of polyurethane foam, and are more stable than hitherto-employed catalysts.

The present application is a continuation-in-part of application Ser. No. 754,716, filed Aug. 22, 1968, now abandoned, which in turn is a continuation-in-part application of Ser. No. 397,609, filed Sept. 18, 1964, now abandoned.

This invention relates to a process for the production of polyurethane foam and, more particularly, to a process for the production of polyurethane foam by using a novel catalyst.

Many compounds, and especially tin compounds, have been employed for practical purposes as catalysts for the reaction of isocyanates with compounds having active hydrogen atoms.

The present invention is based on the observation that, as catalyst for the reaction of an isocyanate with a compound having active hydrogen atoms, the octaalkyl-stannoxane derivatives of general Formula I, infra, unexpectedly have a catalytic activity which is several tenfold times higher than that of the compounds (e.g. dibutyltin-dilaurate, tin(II)-2-ethylhexoate, triethylenediamine, etc.) which have heretofore been regarded as having the highest catalytic activity for the said reaction; that an octa-alkyl-stannoxane derivative (I) of the present invention can be used as a sole catalyst for the production of polyurethane foam; and that, moreover, the compounds (I) are more stable than the hitherto-employed catalysts.

The foregoing is indeed unexpected, since no such catalyst has heretofore been known that can, as sole catalyst, catalyze the most important reactions for the production of polyurethane foam, that is, the polymerisation reaction and the foaming reaction—with good balance between the two reactions—to produce polyurethane foam having good properties and stability.

Due to the high activity of the octaalkyl-stannoxane(I) as catalyst, it is possible to obtain polyurethane foam by the use of a small amount of octaalkyl-stannoxane as catalyst (about half to about one-tenth of the amount of per se known catalyst) without heating and, moreover, the properties of thus-obtained foam remain wholly unimpaired. As the octaalkyl-stannoxanes are very stable, so-called pre-mixed containing such a compound as catalyst can be stored for a long period without undergoing any deterioration. The compounds are easily soluble in polyether polyol or polyester polyol so that polyurethane foam can be obtained by simple procedures. The octaalkyl-stannoxanes according to this invention are thus very effective catalysts for the production of polyurethane foam.

Briefly stated, this invention provides a process for the production of polyurethane foam by allowing polyisocyanate to react with polyether polyol or polyester polyol in the presence of blowing agent and of a compound of the following general formula:

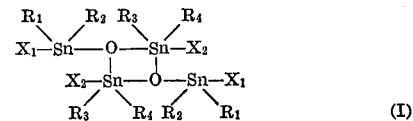

(I)

wherein $X_1$ stands for a halogen atom (e.g. chlorine, bromine, iodine, etc.), a hydroxyl group, a lower alkoxy group (e.g. methoxy, ethoxy, propoxy, butoxy, etc.), formyloxy, alkylcarbonyloxy (e.g. acetoxy, propionoyloxy, butyroyloxy, hexanoyloxy, lauroyloxy, stearoyloxy, etc.), —NCO or —NCS, $X_2$ stands for a hydroxy group, a lower alkoxy group (e.g. methoxy, ethoxy, propoxy, butoxy, etc.), formyloxy, alkylcarbonyloxy (e.g. acetoxy, propionoyloxy, butyroyloxy, hexanoyloxy, lauroyloxy, stearoyloxy, etc.), —NCO or —NCS, and each of $R_1$, $R_2$, $R_3$ and $R_4$—which may be identical or different—stands for lower alkyl such as methyl, ethyl, propyl, butyl, iso-propyl, heptyl and hexyl, and preferably, alkyl of one to four carbon atoms, such as methyl, ethyl, propyl, butyl, iso-propyl, etc.

As to $X_1$ and $X_2$, the preferred compounds are those where, in the general Formula I, $X_1$ is halogen and $X_2$ is hydroxy; both $X_1$ and $X_2$ are formyl or alkylcarbonyloxy groups; $X_1$ is formyl or alkylcarbonyloxy and $X_2$ is hydroxy; $X_1$ is halogen and $X_2$ is lower alkoxy; $X_1$ is lower alkoxy and $X_2$ is formyl or alkylcarbonyloxy; or $X_1$ is —NCO and $X_2$ is —NCS; or both $X_1$ and $X_2$ are —NCO or —NCS groups. As the alkylcarbonyloxy groups, those having two to eighteen carbon atoms are preferred. Alkoxy groups having one to three carbon atoms are preferred.

Of these compounds, the most desirable compounds for practical use are enumerated in the following:

Octabutyl-dichloro-dihydroxy-stannoxane
Octabutyl-tetraacetoxy-stannoxane
Octabutyl-tetrastearoyloxy-stannoxane
Octabutyl-tetraformyloxy-stannoxane
Octabutyl-tetra-2-ethyl-hexanoyloxy-stannoxane
Octapropyl-dichloro-dihydroxy-stannoxane
Octabutyl-tetralauroyloxy-stannoxane
Octaethyl-dichloro-dihydroxy-stannoxane
Octamethyl-dichloro-dihydroxy-stannoxane
Octapropyl-tetraacetoxy-stannoxane
Octaethyl-tetraacetoxy-stannoxane
Octamethyl-tetrastearoyloxy-stannoxane
Octamethyl-tetraacetoxy-stannoxane
Octabutyl-dihydroxy-diacetoxy-stannoxane
Octabutyl-dihydroxy-diformyloxy-stannoxane
Octapropyl-dihydroxy-diacetoxy-stannoxane
Octabutyl-dihydroxy-dilauroyloxy-stannoxane
Octaethyl-dihydroxy-diacetoxy-stannoxane
Octaethyl-dihydroxy-di(2-ethyl-hexanoyloxy)-stannoxane
Octabutyl-dichloro-dimethoxy-stannoxane Octabutyl-dichloro-diethoxy-stannoxane
Octabutyl-dichloro-dipropoxy-stannoxane
Octapropyl-dichloro-dimethoxy-stannoxane
Octaethyl-dichloro-dimethoxy-stannoxane
Octabutyl-tetraisocyanate-stannoxane
Octabutyl-tetraisothiocyanate-stannoxane
Octapropyl-tetraisocyanate-stannoxane
Octaethyl-tetraisocyanate-stannoxane
Octaethyl-tetraisothiocyanate-stannoxane
Octapropyl-tetraformyloxy-stannoxane
Octaethyl-tetraformyloxy-stannoxane
Octamethyl-tetraformyloxy-stannoxane
Octamethyl-diacetoxy-dihydroxy-stannoxane
Octaethyl-diformyloxy-dihydroxy-stannoxane
Octapropyl-diformyloxy-dihydroxy-stannoxane
Octabutyl-dimethoxy-diacetoxy-stannoxane
Octabutyl-dimethoxy-diformyloxy-stannoxane
Octabutyl-diethoxy-diacetoxy-stannoxane
Octabutyl-diethoxy-distearoyloxy-stannoxane
Octabutyl-diethoxy-diformyloxy-stannoxane
Octapropyl-dimethoxy-diacetoxy-stannoxane
Octabutyl-dipropoxy-diacetoxy-stannoxane
Octapropyl-dimethoxy-dilauroyloxy-stannoxane The invention is not restricted to the above-enumerated compounds. Compounds other than those enumerated, so far as they are encompassed by the general Formula I, also have a higher activity as catalyst than catalysts per se known, and have a good effect on the production of polyurethane foam even when used as sole catalyst.

Regarding stannoxane compounds, these have been reported in "Proceedings of the Chemical Society" (1961) pages 457–458 and "Journal of Organometallic Chemistry," vol. 1, No. 1, pages 81–88 (1963). From these references, it is clear that the compounds $R_4Sn_2X_2O$ have at first been assumed to have the distannoxane formula

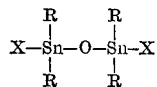

but later these compounds have been more reasonably assumed to form a dimer at least in a solvent. As stated in the references, the most reasonable structure of the dimer can be considered as

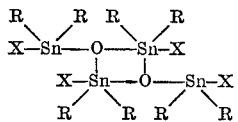

though the precise dimeric structure has not yet been proved.

As well known in the art, organometallic compounds form more complex structure in comparison with ordinary organic compounds, and thus precise chemical structures of organometallic compounds are rather difficult to be proved chemically and/or physically. Such being the circumstances, organometallic compounds have been shown by a hypothetical structure which is considered to be most simplified. For instance, so-called dialkyl tin oxide has been shown by a simple structure of

but actually this compound is not present in the monomer form but in a considerable complex polymeric structure which has not been proved.

In view of the afore-mentioned technical state of this kind of art, the stannoxane compound of the present invention may be shown by any of the monomeric formula (distannoxane structure) and the dimeric structure.

In any event, in the present invention, use is made of, as a catalyst, a compound which has been at first shown by a tetraalkyl distannoxane structure and later considered to form a dimeric structure.

Throughout the present specification, the stannoxane compound is hypothetcially shown by the dimeric structure;

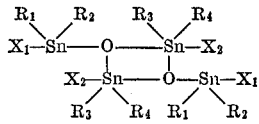

or

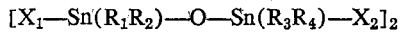

and named octaalkyl stannoxane.

The octaalkyl stannoxane compound of the present invention may be prepared, for example, by the methods described in the "Journal of Organometallic Chemistry," vol. 1, No. 1, pages 81–88 (1963) and "Journal of American Chemical Society," vol. 82, page 3285 (1960). For example, the reaction of a dialkyl tin oxide with an acid or its derivative can give the present compound wherein $X_1$ and $X_2$ are the corresponding alkylcarbonyloxy, the reaction of the compound (I) wherein $X_1$ and $X_2$ are halogen with an alkali hydroxide can give the present compound wherein $X_1$ is halogen and $X_2$ is hydroxy, a partial alcoholysis of the compound (I) wherein $X_1$ and $X_2$ are halogen can give the present compound wherein $X_1$ is halogen and $X_2$ is alkoxy, alcoholysis of the compound (I) wherein $X_1$ and $X_2$ are halogen can give the present compound wherein $X_1$ and $X_2$ are alkoxy, a reaction of the compound (I) wherein $X_1$ and $X_2$ are halogen with an alkali isocyanate can give the object compound wherein $X_1$ and $X_2$ are isocyanate, a reaction of the compound (I) wherein $X_1$ and $X_2$ are isocyanate with an alcohol can give the object compound wherein $X_1$ is isocyanate and $X_2$ is the corresponding alkoxy, and the compound (I) wherein $X_1$ and $X_2$ are halogen can be obtained by the reaction of a dialkyl tin oxide with a hydrohalogenic acid.

The polyether polyol employed in this invention, can be obtained by addition polymerization of one or more alkylene oxides such as ethylene oxide, propyleneoxide, butyleneoxide or styreneoxide, to one or more polyols, as initiator, such as ethylene glycol, diethylene glycol, propylene glycol, glycerol, trimethylol propane, hexane triol, pentaerythritol, sorbitol, sucrose, mannitol, sorbide, mannitan, or sorbitan, or to amines such as ethylene diamine, propylene diamine, ethanolamine, etc., under alkaline or acidic conditions.

These polyether polyols may be prepared in a per se known manner as described in "High Polymer" vol. XIII, Polyethers Part 1 (1963) by Norman G. Gaylord, published by Interscience Publishers, New York, N.Y.

Of the polyether polyols, those having three or more terminal hydroxyl groups are preferable.

Molecular weight of the polyether polyols may be varied according to the desired properties of polyurethane foam, and is generally selected from the range of about 500 to 10,000.

As polyester polyol in this invention, there is employed a product obtained by the reaction of one or more polyols such as ethylene glycol, propylene glycol, diethylene glycol, triethylene glycol, butylene glycol, trimethylol propane, glycerol, hexane triol or pentaerythritol with one or more polycarboxylic acids such as succinic acid, glutaric acid, adipic acid, pimelic acid, suberic acid, azelaic acid, sebacic acid, maleic acid, fumaric acid, itaconic acid, phthalic acid, isophthalic acid, terephthalic acid, or their acid anhydrides.

These polyester polyols are prepared in a per se known manner as described in "Polyesters and Their Application," April 1959, published by Bjorksten Research Lab. Inc., New York, N.Y.

Of the polyester polyols, those having one or more terminal hydroxyl groups are preferable.

Molecular weight of the polyester polyols may vary with the desired properties of polyurethane foam, and is generally selected from the range of about 500 to 10,000.

In this invention, the use of the polyether polyols or polyester polyols, especially the polyether polyols, having three or more terminal hydroxyl groups, more preferably three to nine terminal hydroxyl groups, and a hydroxyl number of about 350 to 700 to obtain so-called rigid polyurethane foam, is most preferable for attaining the object of the invention.

As polyisocyanates in this invention there are employed such aromatic polyisocyanates as tolylene diisocyanate (TDI), diphenylmethane diisocyanate (MDI), dianisidine diisocyanate, biphenylene diisocyanate, naphthylene diisocyanate, phenylene diisocyanate, triphenylmethane triisocyanate, or diphenylether triisocyanate, etc., such aliphatic polyisocyanates as tetramethylene diisocyanate, hexamethylene diisocyanate, etc., and such addition products as those having two or more terminal —NCO groups, which are obtained by the reaction of above mentioned polyisocyanates in excess with lower molecular polyols such as ethylene glycol, propylene glycol, glycerol, hexane triol or trimethylol propane, or with polyester polyol or polyester polyol described above.

Among these polyisocyanates, there are preferably employed such compounds as aromatic polyisocyanates or addition products having two or more —NCO groups which are obtained by the reaction of aromatic polyisocyanates in excess with lower molecular polyols, or with the polyether polyols or the polyester polyols, especially tolylene diisocyanate (TDI), diphenylmethane diisocyanate (MDI) or addition product of the lower molecular polyols or the polyether polyols with excess TDI or MDI.

The objects of this invention can be accomplished by allowing polyether polyols or polyester polyols to react with polyisocyanates in the presence in the reaction mixture of the compound shown by the general Formula I mentioned above and of a blowing agent.

As blowing agents, there are employed those per se known, for example, water, compounds generating water during the reaction, halogenated hydrocarbons having a low boiling point such as dichlorodifluoromethane and trichloromonofluoromethane, or compounds generating nitrogen gas during the reaction such as azo compounds.

The amount of the compound shown by the general Formula I used as a catalyst in this invention is one-half to one-tenth of that of per se known catalyst, that is, about 0.02 to about 0.1 part by weight per 100 parts of reactants, i.e. of the polyisocyanate component and polyether polyol or polyester polyol component. However, if desired, the amount of the catalyst used in this invention may be more than that above mentioned, for example, about 0.1 to about 0.3 part by weight per 100 parts of the said reactants.

In this invention, polyurethane foam with good properties can be obtained easily by the sole use of a compound of Formula I as catalyst; however, the employment of a compound I together with a tertiary amine generally produces even better results.

As tertiary amines for this purpose, there may be used for example, triethylamine, N-methyl morpholine, triethylene diamine, N,N,N',N' - tetra - methyl - 1,3-butane-diamine, N,N,N',N'-tetrakis(2-hydroxypropyl)-ethylene diamine, dimethylethanolamine, N - (2 - hydroxypropyl)-dimethyl morpholine, etc.

The amount of these tertiary amines used ranges according to the invention, from about 0.03 to about 1.0 part by weight per 100 parts of polyisocyanate component and polyether polyol or polyester polyol component. However, the amount, if desired, may be greater than that mentioned above.

For carrying out this invention in accordance with the aforeindicated objects, the reactions may further be effected in the presence in the reaction medium of, for example, foam stabilizer (e.g. silicone oil-poly-dimethyl siloxane, alkylsilanepolyoxyalkylene copolymer), non-ionic surface active agent such as sorbitan monostearate, glycerol monooleate, coloring agent, additives, reinforcing materials, dyes, antioxidant, fireproofing agents, etc. The use of these, alone or in admixture, is optional.

As stated above in detail, since the compound of the general Formula I has an extraordinarily high activity as a catalyst, polyurethane foam can be easily obtained, without heating, by the use of a very small amount of compound of Formula I as catalyst. Moreover, the compounds (I) being very stable themselves, so-called premixes including these compounds as catalyst can be stored for a long time without deterioration. In addition to these merits, since the compounds (I) are easily soluble in polyether polyol or polyester polyol, only a simple procedure is required for the production of polyurethane foam.

It is clear from the foregoing that this invention and the use, according thereto, of a compound of Formula I as a catalyst has much value from the industrial viewpoint.

For the purpose of a better understanding of this invention, the following examples of presently preferred embodiments are given. However, it is to be understood that the invention is not limited to these examples.

In these examples, the amounts are expressed in parts by weight unless otherwise specified. Parts by weight bear the same relation to parts by volume as do grams to milliliters.

EXAMPLES OF THE PREPARATION OF OCTAALKYL-STANNOXANES

Octabutyl-tetralauroyloxy-stannoxane

To 600 parts by volume of toluene are added under stirring 200 parts of lauric acid and 250 parts of dibutyl tin oxide, followed by heating at 60° C. After 15 to 20 minutes, small amount of impurities is filtered off, and toluene and water by-produced are distilled off by heating under reduced pressure. This procedure gives 440 parts of octabutyl-tetralauroyloxy-stannoxane as colorless transparent substance.

Octabutyl-tetraacetoxy-stannoxane

To 500 parts by volume of toluene are added 249 parts of dibutyl tin oxide and then 60 parts of acetic acid under stirring, followed by heating at 50 to 60° C. for 20 to 30 minutes. The resultant is filtered and the filtrate is distilled at 60° C. under pressure of 10 to 30 mm. Hg to remove toluene and water by-produced. The residue is cooled to room temperature to give 300 parts of octabutyl-tetraacetoxy-stannoxane as colorless substance melting at 54 to 57° C.

Octabutyl-dichloro-dihydroxy-stannoxane

Into 2000 parts by volume of acetone is dissolved 300 parts of octabutyl-tetrachloro-stannoxane under heating. To the solution is added 22.4 parts of sodium hydroxide in 200 parts by volume of water, followed by refluxing for 1 hour. The resultant is distilled to remove most of acetone, and the residue is cooled to room temperature. This procedure gives 275 parts of octabutyl-dichloro-dihydroxy-stannoxane as white crystals melting at 115 to 120° C.

Octabutyl-tetraisocyanato-stannoxane 55 parts of octabutyl-tetrachloro-stannoxane is dissolved in a mixture of 600 parts by volume of toluene and 50 parts by volume of ethanol. To the solution is added 16.2 parts of potassium isocyanate, followed by stirring for 1 hour and then further stirring at 70° C. for 1 hour. The resultant is distilled to remove the solvent, and to the residue is added 500 parts by volume of toluene. The mixture is filtered to remove the insolubles (potassium chloride), and the filtrate is concentrated. This procedure gives white crystals, which are then recrystallized from toluene to give octabutyl-tetraisocyanato as white crystals melting at 163 to 166° C.

Octabutyl-diisothiocyanato-diethoxy-stannoxane 10 parts of octabutyl-tetraisothiocyanato-stannoxane is dissolved in 500 parts by volume of ethanol. To the solution is added 5 parts by volume of pyridine, followed by refluxing for 30 minutes. The greater part of ethanol is removed from the resultant, and the residue is cooled, whereby there are precipitated white crystals. Recovering by filtration of the crystals gives 9.2 parts of octabutyl-diisothiocyanato-diethoxy-stannoxane melting at 109 to 116° C.

Octabutyl-tetrachloro-stannoxane

To 1000 parts by volume of acetone are added 250 parts of dibutyl tin oxide and 105 parts of 35% hydrochloric acid, followed by heating at 50° C. After the white of dibutyl tin oxide has disappeared, the resultant is filtered to remove impurities and the filtrate is distilled to remove acetone. The residue is cooled to give octabutyl-tetrachloro-stannoxane as white crystals melting at 110 to 112° C.

EXAMPLE 1

0.005 part of a catalyst (cf. Table 1, infra), 1 part by volume of dioxane, 7.0 parts of polypropylene glycol of molecular weight 460—obtained by addition polymerization of propylene oxide to propylene glycol as an initiator, and 2.4 parts of tolylene diisocyanate containing 80 parts of 2,4-isomer and 20 parts of 2,6-isomer are thoroughly mixed, and a receptacle is immediately filled with the mixture and placed in a 70° C. constant temperature bath.

The ensuing gelation time is measured from the instant the tube is placed in the bath. The gelation time is taken as the time when the mixture no longer visibly flows in the inverted receptacle.

The results obtained are as follows: (in Tables 1 and 2 Me, Pr, Bu, Ac, St, La and 2-Et-Hex respectively designate methyl, propyl, butyl, acetyl, stearoyl, lauroyl and 2-ethyl-hexanoyl):

TABLE 1

| Catalyst: | Gelation time, minutes |
|---|---|
| None | >200 |
| Triethylene diamine | >200 |
| Me$_2$—Sn—NO$_3$(OH) | 105 |
| Me$_2$SnCl$_2$ | >200 |
| (1) | >200 |
| [Cl—(Pr)$_2$SnOSn(Pr)$_2$—Cl]$_2$ | >200 |
| [Cl—(Bu)$_2$SnOSn(Bu)$_2$—Cl]$_2$ | >200 |
| [Cl—(Pr)$_2$SnOSn(Pr)$_2$—OH]$_2$ | 2 |
| [Cl—(Bu)$_2$SnOSn(Bu)$_2$—OH]$_2$ | 2 |
| [(AcO)(Pr)$_2$SnOSn(Pr)$_2$(AcO)]$_2$ | 2 |
| [(AcO)(Bu)$_2$SnOSn(Bu)$_2$(AcO)]$_2$ | 2 |
| [(AcO)(Bu)$_2$SnOSn(Bu)$_2$OH]$_2$ | 2 |
| [NCO(Bu)$_2$SnOSn(Bu)$_2$NCO]$_2$ | 2–4 |
| [Cl—(Me)$_2$SnOSn(Me)$_2$(OCH$_3$)]$_2$ | 2–4 |
| [(StO)(Bu)$_2$SnOSn(Bu)$_2$(OSt)]$_2$ | 2 |
| [(LaO)(Bu)$_2$SnOSn(Bu)$_2$(OLa)]$_2$ | 2 |
| [(2-Et-Hex-O)(Bu)$_2$SnOSn(Bu)$_2$(O-2-Et-Hex)]$_2$ | 2 |

¹ Formula:

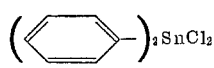

EXAMPLE 2

Example 1 is repeated, except that 3.5 parts of 4,4′-diphenylmethane diisocyanate are used in place of 2.4 parts of tolylene diisocyanate, and that the dioxane is omitted. Gelation time is measured as in Example 1; the results are as follows:

TABLE 2

| Catalyst: | Gelation time, minutes |
|---|---|
| None | >60 |
| Dibutyltindilaurate | 14 |
| Tin(II)-2-ethylhexoate | 10 |
| [(AcO)(Pr)$_2$SnOSn(Pr)$_2$(OAc)]$_2$ | 0.5 |
| [Cl(Pr)$_2$SnOSn(Pr)$_2$OH]$_2$ | 1.5 |
| [Cl(Bu)$_2$SnOSn(Bu)$_2$OH]$_2$ | 1.0 |

EXAMPLE 3

A component

| | Parts |
|---|---|
| Polyethertriol of hydroxyl number 56 obtained by addition polymerization of propylene oxide to trimethylol propane as an initiator | 100 |
| Octa-butyl-tetra-acetoxystannoxane | 0.2 |

B component

| | Parts |
|---|---|
| Water | 4.0 |
| Silicone oil | 2.0 |

C component

| | Parts |
|---|---|
| Tolylene diisocyanate (2,4-isomer 80 parts, 2,6-isomer 20 parts) | 49.6 |

A, B and C components are mixed homogeneously at 25° C. to allow the reaction to take place, and white elastic foam having a density of 0.026 gram per cubic centimeter is obtained: rise time—1 minute and fifty seconds; gelation time—two minutes and twenty-five seconds.

EXAMPLE 4

A component

| | Parts |
|---|---|
| Polyether triol of hydroxyl number 56 obtained by addition polymerization of propylene oxide to glycerol as an initiator | 100 |
| Octa-butyl-tetra-acetoxystannoxane | 0.2 |

B component

| | Parts |
|---|---|
| Water | 4.0 |
| Silicone oil | 2.0 |
| Triethylene diamine | 0.07 |

C component

| | Parts |
|---|---|
| Tolylene diisocyanate (2,4-isomer 80 parts, 2,6-isomer 20 parts) | 49.6 |

A, B and C components are mixed homogeneously at 25° C. to allow the reaction to take place, and white elastic foam having a density of 0.025 gram per cubic centimeter is obtained: cream time—7 seconds; rise time—one minute and twenty seconds; gelation time—1 minute and forty-five seconds.

EXAMPLE 5

A component

| | Parts |
|---|---|
| Polyether triol of hydroxyl number 56 obtained by addition polymerization of propylene oxide to trimethylol propane as an initiator | 50 |
| Octa-propyl-tetra-acetoxystannoxane | 0.2 |

B component

| | Parts |
|---|---|
| Water | 4.0 |
| Triethylene diamine | 0.07 |
| Silicone oil | 2.5 |

C component

| | Parts |
|---|---|
| Tolylene diisocyanate (2,4-isomer 80 parts, 2,6-isomer 20 parts) | 48.7 |
| Trichloromonofluoromethane | 20 |

A, B and C components are mixed homogeneously at 23° C. to allow the reaction to take place, and white elastic foam having a density of 0.016 gram per cubic centimeter is obtained: rise time—one minute and fifty seconds; gelation time—two minutes and twenty-three seconds.

EXAMPLE 6

A component

| | Parts |
|---|---|
| Polyether triol of hydroxyl number 460 obtained by addition polymerization of propylene oxide to glycerol as an initiator | 100 |
| Dimethylethanol amine | 1.5 |
| Silicone oil | 1.5 |
| Trichloromonofluoromethane | 30 |
| Octa-butyl-diacetoxy-dihydroxystannoxane | 0.2 |

B component

| | Parts |
|---|---|
| Polyisocyanate compound having amine equivalent 108 and acid number 0.25 ("Nacconate–4040"*) | 93 |

*The term "Nacconate–4040" is a registered trade name of a phosgenation product of tolylene diamine having the following properties: Brown liquid free of sediment, amine equivalent 108, viscosity (Brookfield) 90 to 25° C., specific gravity (25° C./25° C.) 1.26, solidification point lower than −15° C., and approximate flash point (Cleveland open cup) 132° C.

A and B components are mixed homogeneously at 21° C. to allow the reaction to take place, and a tough and rigid foam having a density of 0.032 gram per cubic centimeter is obtained: cream time—thirty seconds; rise time—1 minute and twenty seconds; gelation time—1 minute and twenty seconds.

EXAMPLE 7

A component

| | Parts |
|---|---|
| Polyether polyol of hydroxyl number 530 obtained by addition polymerization of propylene oxide to sorbitol as an initiator | 100 |
| Silicone oil | 1 |
| Octa-butyl-dichloro-dihydroxystannoxane | 0.35 |

B component

| | Parts |
|---|---|
| Prepolymer having amine equivalent 139 and acid number 0.005 obtained by the reaction of excess tolylene diisocyanate (2,4-isomer 80 parts, 2,6-isomer 20 parts) with the same polyether polyol as in A component | 139 |

A and B components are mixed homogeneously at 22° C. to allow the reaction to take place, and a tough and rigid foam having a density of 0.033 gram per cubic centimeter is obtained: cream time—forty second; rise time—1 minute and twenty-five seconds; gelation time—1 minute and thirty seconds.

EXAMPLE 8

Polyether triol of hydroxyl number 56 obtained by addition polymerization of propylene oxide to hexane triol as an initiator (100 parts), water (4.0 parts), silicone oil (2.0 parts), tolylene diisocyanate containing 80 parts of 2,4-isomer and 20 parts of 2,6-isomer (49.6 parts) and octa-butyl-tetra-acetoxystannoxane (0.17 part) are mixed to allow the reaction to take place at room temperature (15 to 30° C.), and white elastic foam having a density of 0.028 gram per cubic centimeter, a tensile strength of 1.11 kilograms per square centimeter and an elongation of 220% is obtained.

EXAMPLE 9

By employing the same reactions and the same procedure as in Example 8 except using 0.17 part of octa-butyl-diacetoxy-dihydroxystannoxane in place of 0.17 part of tetrabutyl-1,3-diacetoxydistannoxane, elastic foam having a density of 0.027 gram per cubic centimeter, a tensile strength of 1.19 kilograms per square centimeter and an elongation of 250% is obtained.

EXAMPLE 10

A component

| | Parts |
|---|---|
| Polyether triol of hydroxyl number 56 obtained by addition polymerization of propylene oxide to trimethylol propane as an initiator | 100 |
| Octa-butyl-tetra-isothiocyanatestannoxane | 0.1 |

B component

| | Parts |
|---|---|
| Water | 4.0 |
| Silicone oil | 2.0 |
| Triethylene diamine | 0.07 |

C component

| | Parts |
|---|---|
| Tolylene diisocyanate (2,4-isomer 80 parts, 2,6-isomer 20 parts) | 49.6 |

A, B and C components are mixed homogeneously at 20° C., and white elastic foam having a density of 0.025 gram per cubic centimeter is obtained: cream time—ten seconds; rise time—1 minute and fifty seconds; gelation time—two minutes and fifty seconds.

The physical properties of the polyurethane foams prepared in Examples 3, 4, 5, 6, 7 and 10 (the physical properties of the polyurethane foams of Examples 8 and 9 having already been described in the examples proper) may be graphically described in Table 3 below:

TABLE 3

| | Example number | | | | | |
|---|---|---|---|---|---|---|
| | 3 | 4 | 5 | 6 | 7 | 10 |
| Density, g./cm.³ | 0.026 | 0.025 | 0.016 | 0.032 | 0.033 | 0.025 |
| Tensile strength, kg./cm.² | 1.2 | 1.22 | 0.75 | | | 1.18 |
| Elongation, percent | 195 | 200 | 175 | | | 200 |
| I.L.D. (25% deflection) | 18.1 | 17.6 | 3.2 | | | 17.4 |
| Tear strength kg./cm. | 0.4 | 0.41 | 0.30 | | | 0.39 |
| Compression load, kg./cm.² (10% deflection) | | | | 2.8 | 2.6 | |
| Dimensional stability (volume change in percent) after: | | | | | | |
| 70° C.—24 hrs | | | | <1 | <1 | |
| −30° C.—24 hrs | | | | <1 | <1 | |

EXAMPLE 11

100 parts of polyester triol having hydroxyl number of 57 which is obtained by the condensation of adipic acid (146 parts), diethylene glycol (127 parts) and trimethylol propane (13.4 parts) at 180° C., 2.5 parts of water, 2.0 parts of nonionic surface active agent, 1.0 part of N-methyl-morpholine, 0.1 part of octa-butyl-tetra-acetoxystannoxane and 35 parts of tolylene diisocyanate (2,4-isomer 80 parts, 2,6-isomer 20 parts) are mixed homogeneously at room temperature to allow the reaction to take place, and beautiful white elastic foam having a density of 0.04 gram per cubic centimeter and a tensile strength of 1.5 kilograms per square centimeter is obtained: rise time—1 minute and forty seconds; gelation time—two minutes and fifteen seconds.

EXAMPLE 12

160 parts of polyester triol having hydroxyl number of 424 and acid number of 6.1 which is obtained by the condensation of phthalic anhydride (296 parts), adipic acid (1168 parts), trimethylol propane (1980 parts) and 1,3-butylene glycol (360 parts), 165 parts of prepolymer having amine equivalent of 124.7 which is obtained by the reaction of tolylene diisocyanate containing 80 parts of 2,4-isomer and 20 parts of 2,6-isomer (48.5 parts), hexane triol (8 parts) and propylene glycol (2.0 parts), 52 parts of trichloromonofluoromethane, 0.2 part of octa-butyl-tetra-acetoxystannoxane, 0.5 part of dimethylethanol amine, and 1.5 parts of silicone oil are thoroughly mixed to allow the reaction to take place, and rigid foam having a density of 0.046 gram per cubic centimeter, a compression load of 2.60 kilograms per square centimeter and a good resistance to chemicals is obtained: rise time—two minutes; gelation time—three minutes.

EXAMPLE 13

So-called pre-mix compositions are prepared by mixing components shown in Table 4 in the respective ratios specified therein. After thus prepared pre-mix compositions have been stored at 13–15° C. for certain periods, polyisocyanate component is added to these pre-mix compositions to produce polyurethane foam, and both the cream time and the rise time are measured. The results are listed in Table 5.

C component

| | Weight parts |
|---|---|
| Tolylene diisocyanate (2,4-isomer 80 weight parts, 2,6-isomer 20 weight parts) | 49.6 |

A, B and C components are mixed homogeneously at 25° C. to allow a reaction to take place. Rise time and gel time are determined, and an appearance of the polyurethane foam produced is observed.

The results of these tests are shown in the following table:

TABLE 6

| Test No. | Catalyst | Rise time, min. | Gel time, min. | Appearance of foam |
|---|---|---|---|---|
| CONTROL COMPOUNDS | | | | |
| 1 | None | 3 | 10 | Very fragile foamy mass (spongecake-like) is produced and it is crumbled by only lightly pressing. |
| 2 | (LaO)(Bu)$_2$SnO(Bu)$_2$SnO(Bu)$_2$SnO(Bu)$_2$Sn(OH) | 2 | 3 | Foam product having large cracks. |
| 3 | (AcO)(Bu)$_2$SnO(Bu)$_2$SnO(Bu)$_2$SnO(Bu)$_2$Sn(OH) | 2 | 3 | Do. |
| 4 | (Bu)$_3$—SnOSn—(Bu)$_3$ | 3 | 10 | Very fragile foamy mass (spongcake-like) is produced and it is crumbled by only lightly pressing. |
| 5 | C$_7$H$_{15}$COO—(Bu)$_2$SnO(Bu)$_2$SnO(Bu)$_2$Sn (OH) | | | |
| COMPOUNDS OF THE U.S. PATENT APPLICATION SER. NO. 397,609 | | | | |
| 6 | [(AcO)(Bu)$_2$SnOSn(Bu)$_2$OH]$_2$ | 1.1/6 | 1.1/4 | Very good. |
| 7 | [(AcO)(Bu)$_2$SnOSn(Bu)$_2$(OAc)]$_2$ | 1.1/6 | 1.1/4 | Do. |
| 8 | [(LaO)(Bu)$_2$SnOSn(Bu)$_2$OH]$_2$ | 1.1/6 | 1.1/4 | Do. |
| 9 | [(LaO)(Bu)$_2$SnOSn(Bu)$_2$(OLa)]$_2$ | 1.1/6 | 1.1/4 | Do. |

TABLE 4

| | Formulation | | | | |
|---|---|---|---|---|---|
| | 1 | 2 | 3 | 4 | 5 |
| Polyether polyol* | 100 | 100 | 100 | 100 | 100 |
| Silicone oil | 1.5 | 1.5 | 1.5 | | |
| Dimethyl ethanol amine | 2.0 | 2.0 | 2.0 | 2.0 | 2.0 |
| Octa-butyl-tetra-acetoxystannoxane | 1.0 | | | 1.0 | |
| Dibutyltindilaurate | | 1.0 | | | 1.0 |
| Stannous octate | | | 1.0 | | |
| Dibutyl phthalate | 5.0 | 5.0 | 5.0 | 5.0 | 5.0 |
| Trichloromonofluoromethane | 30 | 30 | 30 | 30 | 30 |

*Polyether polyol of hydroxyl number 460 which is obtained by addition polymerization of propylene oxide to sorbitol as an initiator.

TABLE 5

| | Formulation | | | | |
|---|---|---|---|---|---|
| | 1 | 2 | 3 | 4 | 5 |
| Initial: | | | | | |
| Cream time | 25″ | 50″ | 28″ | 25″ | 50″ |
| Rise time | 50″ | 100″ | 55″ | 50″ | 100″ |
| Appearance of foam | G | G | G | G | G |
| After 70 days: | | | | | |
| Cream time | 25″ | X | 65″ | 25″ | 50″ |
| Rise time | 35″ | X | 175″ | 55″ | 126″ |
| Appearance of foam | G | | G | G | G |
| After 100 days: | | | | | |
| Cream time | 23″ | X | 75″ | 26″ | 48″ |
| Rise time | 46″ | X | 212″ | 50″ | 102″ |
| Appearance of foam | G | | C | G | G |

NOTE.—G=Good; C=Coarse; X=No foaming; ″=Seconds.

In order to further illustrate the differences between the catalyst used in the present invention and that of conventional catalyst utilized in the production of polyurethane foams the following comparison tests have been made:

TESTS

A component

| | Weight parts |
|---|---|
| Polyethertriol of hydroxyl number 56 obtained by addition polymerization of propylene oxide to trimethylol propane as an initiator | 100 |
| Catalyst (variable) | 0.3 |

B component

| | Weight parts |
|---|---|
| Water | 4.0 |
| Silicone oil | 2.0 |

In the above table, AcO, Bu and La are abbreviations of acetyl, butyl and lauroyl, respectively; substantially no polyurethane foam can be produced by the use of the compound No. 5 as the catalyst in the proportions utilized therein.

A detailed tabulation of the physical properties of the polyurethane foams produced Nos. 7, 8, 9 and 10 above is shown below:

TABLE 6A

| | Test No. | | | |
|---|---|---|---|---|
| | 7 | 8 | 9 | 10 |
| Density, g./cm.$^3$ | 0.025 | 0.025 | 0.025 | 0.025 |
| Tensile strength, kg./cm.$^2$ | 1.2 | 1.18 | 1.21 | 1.17 |
| Elongation, percent | 220 | 210 | 225 | 210 |
| I.L.D. (25% deflection), kg | 17.9 | 18.2 | 17.8 | 18.1 |
| Tear strength, kg./cm | 0.42 | 0.4 | 0.43 | 0.41 |

In tests Nos. 1–5 inclusive, it was impossible to measure the physical properties of the resulting products because they were either fragile foamy masses or had large cracks in their structure.

In order to illustrate the characteristics of foams produced by the organo-tin catalysts of the present invention with or without the use of an auxiliary tertiary amine component as compared with the characteristics of foams produced by a conventional catalyst, the following tests were made:

Polyurethane foams prepared after the same manner as Example 3 of the present disclosure were prepared and the physical properties of these foams were measured. The results of these measurements are shown in the table below:

TABLE 7a

| | Formulation No. | | | | |
|---|---|---|---|---|---|
| | 1 | 2 | 3 | 4 | 5 |
| Octa-butyl-tetra-acetoxystannoxane | 0.05 | 0.1 | | | |
| Triethylene diamine | 0.03 | | 0.1 | 0.1 | |
| Tin(II)-2-ethylhexoate | | | 0.3 | 0.2 | 0.3 |
| Polyether in Exp. 3 | 100 | 100 | 100 | 100 | 100 |
| Water | 4.0 | 4.0 | 4.0 | 4.0 | 4.0 |
| Silicone oil | 2.0 | 2.0 | 2.0 | 2.0 | 2.0 |
| TDI in Exp. 3 | 49.6 | 49.6 | 49.6 | 49.6 | 49.6 |

NOTE.—The numbers in the table are parts by weight.
Formulation:
No. 1=Present method with co-use of an amine catalyst.
No. 2=Present method without co-use of an amine catalyst.
No. 3=Most commonly used conventional formulation.

TABLE 7b

| | Formulation No. | | | | |
|---|---|---|---|---|---|
| | 1 | 2 | 3 | 4 | 5 |
| Density, g./cm.³ | 0.026 | 0.026 | 0.025 | | |
| Tensile strength, kg./cm.² | 1.22 | 1.2 | 1.2 | | |
| Elongation, percent | 193 | 195 | 210 | | |
| I.L.D. (25% deflection), kg | 17.8 | 18.1 | 17.2 | (¹) | (²) |
| Tear strength, kg./cm | 0.4 | 0.4 | 0.4 | | |

¹ Fragile foamy mass is produced. Measurement is substantially impossible.
² Substantially no polyurethane foam applicable to practical use is produced.

As can be readily seen by the foregoing examples and table of the specification, the most characteristic feature of the stannoxane catalysts of the present invention resides in the fact that it can be used in much smaller amounts than closely related conventional catalysts and yet produce a satisfactory form. Thus, for example by using the present catalysts in an amount of only about one-sixth (0.05/0.3) of that of the most conventionally used catalyst (tin (II)-2-ethyl hexoate) a foam having as good, if not better physical properties can be produced.

What is claimed is:

1. In a process for the production of polyurethane foam which comprises intimately admixing and reacting together an organic aromatic or aliphatic polyisocyanate or NCO terminated compounds prepared by the reaction of an excess amount of such aromatic or aliphatic isocyanate with a low molecular polyol and a polyol selected from the group consisting of polyether polyol and polyester polyol in the presence in the reaction mixture of a blowing agent and catalyst, the improvement according to which the catalyst is a compound of the formula

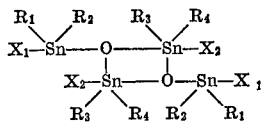

wherein $X_1$ is a member selected from the group consisting of halogen, OH, lower alkoxy, formyloxy, alkylcarbonyloxy, —NCO and —NCS, $X_2$ is a member selected from the group consisting of OH, lower alkoxy, formyloxy, alkylcarbonyloxy, —NCO and —NCS, and each of $R_1$, $R_2$, $R_3$ and $R_4$ is lower alkyl.

2. A process according to claim 1 wherein the reaction mixture also contains a catalytic amount of a tertiary amine.

3. A process according to claim 1 wherein said compound (I) is present in an amount ranging from about 0.02 part to about 0.1 part by weight per 100 parts of polyisocyanate plus polyol.

4. A process according to claim 2 wherein the tertiary amine is present in an amount ranging from about 0.03 part to about 0.3 part by weight per 100 parts of the combined weight of polyisocyanate and polyol.

5. A process according to claim 1 wherein the polyol is a polyether polyol having at least three terminal hydroxy groups and a hydroxyl number of about 350 to about 700, and the polyisocyanate being tolylene diisocyanate.

6. A process according to claim 1 wherein the polyol is a polyether polyol having at least three terminal hydroxy groups and a hydroxyl number of about 350 to about 700, and the polyisocyanate being diphenylmethane diisocyanate.

7. A process according to claim 1 wherein the polyol is a polyether polyol having three to nine terminal hydroxy groups and a hydroxyl number of about 350 to about 700, and the polyisocyanate being tolylene diisocyanate.

8. A process according to claim 1 wherein the polyol is a polyether polyol having three to nine terminal hydroxy groups and a hydroxyl number of about 350 to about 700, and the polyisocyanate being diphenylmethane diisocyanate.

9. A process according to claim 2 wherein the polyol is a polyether polyol having three to nine terminal hydroxy groups, a hydroxyl number of about 350 to about 700, and the polyisocyanate being tolylene diisocyanate.

10. A process according to claim 2 wherein the polyol is a polyether polyol having three to nine terminal hydroxy groups and a hydroxyl number of about 350 to about 700, the polyisocyanate being diphenylmethane diisocyanate.

11. A process according to claim 1 wherein the polyol is a polyether polyol having three to nine terminal hydroxy groups and a hydroxyl number of about 350 to about 700, and the polyisocyanate being tolylene diisocyanate, the catalyst being present in an amount from about 0.02 to about 1 part by weight per 100 parts of polyisocyanate and polyol.

12. A process according to claim 1 wherein the polyol is a polyether polyol having three to nine terminal hydroxy groups and a hydroxyl number of about 350 to about 700, and the polyisocyanate being diphenylmethane diisocyanate, the catalyst being present in an amount from about 0.02 to about 1 part by weight per 100 parts of polyisocyanate and polyol.

13. A process according to claim 1 wherein the catalyst is octa-butyl-dichloro-dihydroxy-stannoxane.

14. A process according to claim 1 wherein the catalyst is octa-butyl-diacetoxy-dihydroxy-stannoxane.

15. A process according to claim 1 wherein the catalyst is octa-butyl-tetraacetoxy-stannoxane.

16. A process according to claim 1 wherein the catalyst is octa-butyl-dimethoxy-diacetoxy-stannoxane.

17. A process according to claim 1 wherein the catalyst is octa-butyl-tetraisocyanato-stannoxane.

References Cited

UNITED STATES PATENTS

| 3,073,788 | 1/1963 | Hostettler et al. | 260—2.5 |
| 3,084,177 | 4/1963 | Hostettler et al. | 260—404.5 |
| 3,194,770 | 7/1965 | Hostettler | 252—431 |
| 3,582,501 | 6/1971 | Hostettler et al. | 260—2.5 |

FOREIGN PATENTS

| 1,124,459 | 8/1968 | Great Britain | 260—2.5 AB UX |
| 243,374 | 5/1960 | Australia | 260—2.5 AC |
| 248,966 | 1/1964 | Australia. | |

OTHER REFERENCES

Okawara et al.: Jour. Organometallic Chem., vol. 1, No. 1, pp. 81–88 (1963).

Proceedings of The Chemical Society (London), pp. 457–458 (1961).

JAMES A. SEIDLECK, Primary Examiner

H. S. COCKERAM, Assistant Examiner

U.S. Cl. X.R.

260—2.5 AB, 77.5 AB, 77.5 AC